United States Patent [19]
Benassi

[11] 3,737,735
[45] June 5, 1973

[54] AUTOTRANSFORMER ASSISTED RESONATED ENERGY TRANSFER CIRCUIT

[75] Inventor: Dominic A. Benassi, St. Paul, Minn.
[73] Assignee: Minnesota Mining and Manufacturing Company, St. Paul, Minn.
[22] Filed: Feb. 4, 1972
[21] Appl. No.: 223,510

[52] U.S. Cl. ............317/148.5 B, 321/20, 321/45 C
[51] Int. Cl..............................................H03k 17/56
[58] Field of Search ............................321/20, 45 C; 307/240, 252 M, 252 J, 284; 317/148.5 B

[56] References Cited
UNITED STATES PATENTS 3,673,437   6/1972   Wright..............................307/252 J
3,534,243   10/1970  Kondo et al. ........................321/45 R
3,489,926   1/1970   Adams et al. ...................317/148.5 B

*Primary Examiner*—J. D. Miller
*Assistant Examiner*—Harry E. Moose, Jr.
*Attorney*—Alexander, Sell, Steldt & Delahunt

[57] ABSTRACT

An improved electrical circuit for producing a damped oscillatory magnetic field having an autotransformer as the inductive component of a parallel inductance-capacitance resonant circuit. An SCR is provided for controllably connecting the resonant circuit to a power source. Reverse voltages in the autotransformer commutate the SCR to cause dissipation of energy in a damped oscillation in the resonant circuit. The damped oscillatory magnetic field is useful in systems for detecting magnetic objects.

9 Claims, 2 Drawing Figures

PATENTED JUN 5 1973

3,737,735

AUTOTRANSFORMER ASSISTED RESONATED ENERGY TRANSFER CIRCUIT

BACKGROUND OF THE INVENTION

1. Field of the Invention

This invention generally relates to electrical circuits for producing oscillations in a resonant circuit. In particular, the invention is adapted for coupling a substantial amount of energy from a D.C. supply source to the resonant circuit wherein currents induced in the resonant circuit create a magnetic field of sufficient intensity to be useful in systems designed to detect the presence of magnetic objects.

2. Description of the Prior Art

Electrical circuits for producing oscillating currents in inductance-capacitance resonant circuits are old in the art. A preferred method of coupling a predetermined amount of energy from a storage capacitor to such a resonant circuit is disclosed in co-pending U.S. Patent application Ser. No. 50,840, filed June 29, 1970 now U.S. Pat. No. 3,673,437, the assignee of which is the same as that of the present invention. In that patent it is disclosed that a silicon controlled rectifier (SCR) may preferably be employed to couple the resonant circuit to a source of electrical energy. Commutation of the SCR is there ensured by the addition of an inductor in series between the resonant circuit and the SCR. It is preferred that the inductive component of the resonant circuit is at least 4.7 times the inductance of the inductor.

U.S. Pat. No. 3,534,243 also provides for a D.C. supply coupled in series with a resonant tank circuit, a series inductor and a SCR. That patent differs materially from both the copending application and the present invention in that the inductance of the series inductor is required to be much greater than that of the resonant circuit inductor. The patent does not disclose the use of an autotransformer providing the dual purpose of amplifying the voltage applied to the resonant circuit and of commutating the SCR.

SUMMARY OF THE INVENTION

This invention provides an improved electrical circuit for intermittently coupling energy from a D.C. power source to a parallel inductance-capacitance resonant circuit, thereby producing an oscillation in the resonant circuit, in which the frequency and Q factor of the oscillations are dictated by the characteristics of the resonant circuit. The improvement provides an electrical circuit wherein a predetermined amount of energy from a D.C. power source is coupled through a SCR to an inductance-capacitance resonant circuit in which the inductive component is an autotransformer. By controlling the characteristics of the autotransformer such that the winding contains a total of at least 30 turns, a primary portion contains between one-fifth and two-thirds of the total number of turns, and a secondary portion contains a greater number of turns than that in the primary portion, it has been found that no additional circuit components are required to commutate the SCR. This circuit provides the additional advantage of producing a noise free damped oscillation, in that no additional tuned circuits are present, the fields of which may distort the field produced by the resonant circuit.

In another embodiment, the primary portion of the autotransformer is shunted with a diode such that reverse oscillatory currents in the resonant circuit are shorted out, thereby resulting in the production of a unidirectional magnetic field.

In a further embodiment, the triggering means is controlled by a circuit responsive to the voltage of the D.C. supply means and prevents switching the SCR into a conductive state unless the voltage is in excess of a predetermined value.

The use of an autotransformer provides several advantages. The inductor required to commutate the SCR is eliminated altogether, thus resulting in a simpler and less expensive circuit. The autotransformer provides a step-up in voltage across the capacitor in the resonant circuit. As is well known to those skilled in the art, the energy stored in a capacitor is proportional to the square of the voltage, and is proportional to the capacitance. The use of a higher voltage enables a much greater amount of energy to be stored for a given value capacitor. The circuit is also ideally adapted to provide a unidirectional field as well as a damped oscillatory field in a manner not shown heretofore.

DESCRIPTION OF THE PREFERRED EMBODIMENT

In one embodiment, the oscillating current in the autotransformer produces a damped oscillatory electromagnetic field. Other applications wherein the oscillating current is useful include flash tube power systems, battery powered motor systems such as may be used in fork lift trucks where the power in the motor field coil is controlled, and in the reduction of hysteresis effects in electric, dielectric, piezoelectric, magnetic, pneumatic, hydraulic and mechanical systems.

Figure 1:
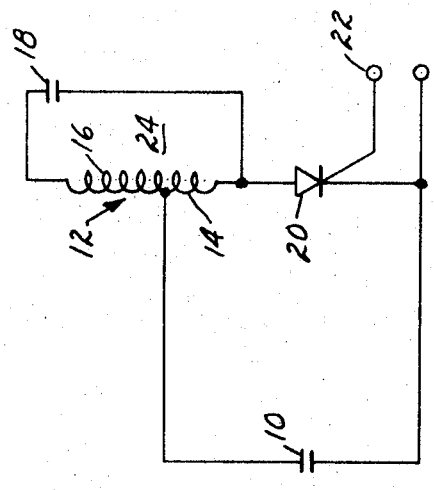
FIG. 1 shows a simplified example of the electrical circuit of the present invention.

In the circuit shown in FIG. 1, a storage capacitor 10 is connected in series with the primary portion 14 of an autotransformer 12 and a silicon controlled rectifier (SCR) 20. A resonant circuit 24 is shown which includes the secondary portion 16 of the autotransformer 12 connected in parallel with a resonating capacitor 18. The operation of the circuit is as follows. The storage capacitor 10 is initially charged from an external power source (not shown) to a predetermined voltage level. The presence of a triggering signal at terminal 22 connected to the gate electrode of SCR 20 causes the SCR 20 to switch to a conducting state. This completes the series circuit comprising storage capacitor 10, primary portion 14 and the conducting SCR 20, and results in a surge of current from the storage capacitor 10 flowing through the primary portion 14 and SCR 20 back to the storage capacitor 10. At the same time, the current in the primary portion 14 is inductively coupled to the resonant circuit 24 via the secondary portion of the autotransformer 16.

Nearly all the energy initially stored in the storage capacitor 10 will be transferred into the relatively low loss autotransformer resonant circuit 24 if the SCR 20 is turned off or commutated to prevent current flow back to the storage capacitor 10. In addition, since it is preferred that the storage capacitor 10 be an electrolytic capacitor, it is desirable that the SCR be turned off in order to prevent undesirable reverse charging of the electrolytic capacitor to prevent damage thereto.

Since the gate of the SCR 20 loses control once the SCR is triggered, other means are required to stop the flow of current through the SCR in order to trap and couple the maximum amount of energy in the resonant circuit 24. The automatic commutation of the SCR at a point where nearly maximum energy is transferred from the storage capacitor 10 into the resonant circuit 24 is accomplished by a momentarily negative reverse bias produced by the resonant circuit 24 on the SCR 20. This switching or commutating of the SCR is accomplished automatically because the reverse discharging of the resonating capacitor 18 back into the winding of the autotransformer creates a counter-EMF in the primary portion 14 which is greater than the voltage supplied by the partially discharged storage capacitor 10. This use of the reverse voltage in the primary portion 14 provides the commutation of the SCR without the need of any auxiliary circuitry, and also allows a step-up in voltage in the resonating circuit 24. The higher frequency oscillating current in the resonant circuit 24 virtually cancels the current flowing through the SCR 20 at least momentarily (during the turnoff interval) by virtue of the overwhelming bucking voltage developed across the primary portion 24. The difference in the phase of the voltage wave forms due to the different resonant frequencies of the two autotransformer coupled resonant circuits, the first comprising the storage capacitor 10 and the primary portion 14 and the second comprising the resonant circuit 24, abruptly changes the net voltage developed across the sCR 20 to momentarily reverse bias it, turn it off and hold it off. It is held off long enough that when the forward voltage is applied due to the change in the phase of the oscillation in the resonant circuit 24 adding to the remaining voltage on the storage capacitor 10 the SCR 20 will not be turned on again. This method of commutation tends to provide a shorter turnoff time at the moment of nearly optimum energy transfer and thereby provide a greater amount of energy transfer to the resonant circuit 24 than is possible with other switching circuits which delay the turnoff of the SCR. The resonant circuit 24 is intentionally designed to minimize resistive losses by providing a high quality oil filled resonating capacitor 18 and a low loss inductor. This provides a resonant circuit 24 having a relatively high Q which results in a damped oscillating signal having appreciable intensity for approximately 10 oscillations.

Before a gate pulse is applied to the SCR 20, the storage capacitor 10 is charged and the resonating capacitor 18 is uncharged. When the SCR 20 is triggered, a large pulse of current flows from the storage capacitor 10 through the primary portion 14 of the autotransformer 12 into the anode electrode of the SCR 20 and back to the negative side of the storage capacitor 10. At the same instant a very small short pulse of current flowing through the SCR 20 starts to charge up the resonating capacitor 18. A relatively large pulse of current flowing in the resonant circuit 24, because of the mutual inductance coupling between the primary portion 14 and secondary portion 16, continues to charge the resonating capacitor 18 until the voltage across it exceeds that developed by the mutual inductance excitation in the autotransformer. The high voltage resonant circuit 24 at that point reverses and attempts to flow through the common winding primary portion 14 as well as through the storage capacitor 10 in opposition to the forward "load" current flowing through the SCR 20. At this point the SCR 20 turns off leaving virtually all the energy from the storage capacitor 10 trapped in the high voltage resonant circuit 24. At some instant, due to the low losses and resonance of the now isolated resonant circuit 24, nearly all of the trapped energy is stored at high voltage in the resonating capacitor 18. The size, weight and cost advantages of storage of energy in a capacitor at relatively high voltage and relatively small capacitance are realized because of the higher voltage and the more compact and efficient autotransformer step-up capabilities.

The switching point or actual instant of commutation depends upon several factors including the component values used in the driving circuit and in the resonant circuit 24 as well as the initial voltage or charge stored in the storage capacitor 10. Fortunately, aging effects which change the value of the storage capacitor 10 when an electrolytic capacitor is used, do not greatly affect the switching point or other operation of this circuit. Commutation is caused to occur at about one-fourth of a cycle of the damped oscillation produced in the resonant circuit 24.

Figure 2:
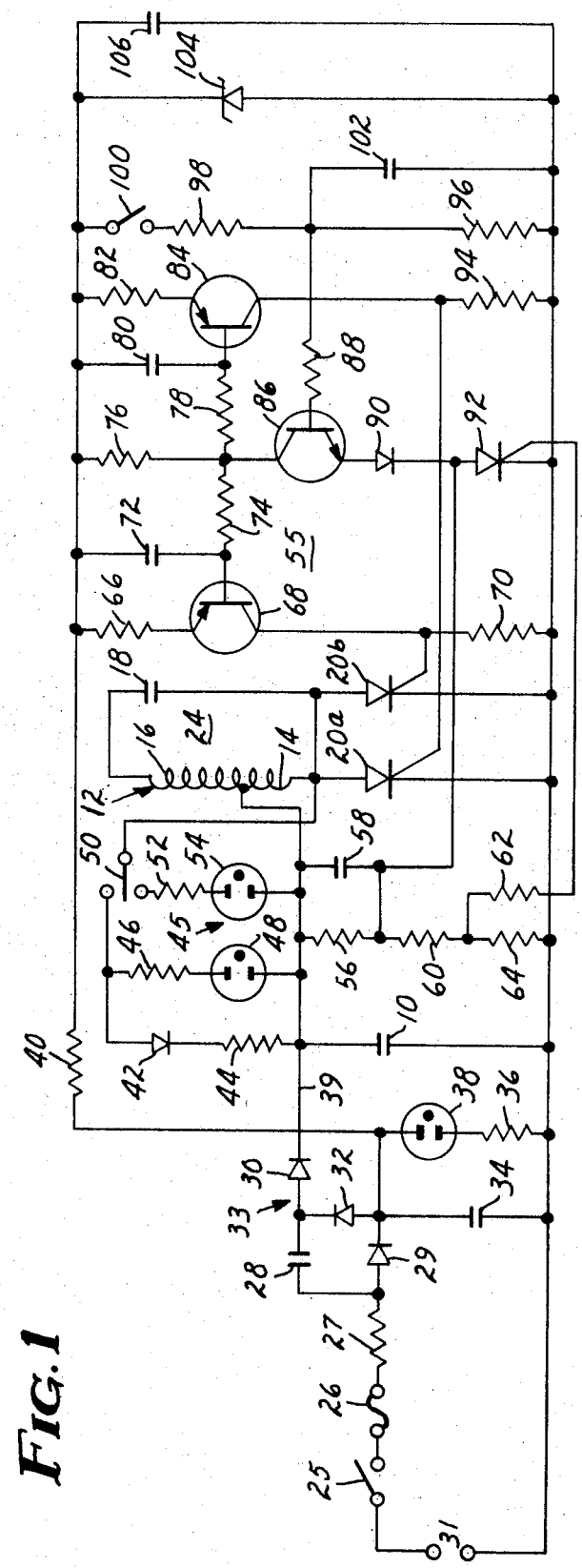
FIG. 2 shows a detailed schematic of the use of the circuit of FIG. 1 in a magnetic field generating device suitable for producing fields for use in magnetic object detection and surveillance systems.

FIG. 2 sets forth a preferred embodiment of utilizing the general circuit disclosed in FIG. 1 in conjunction with an anti-pilferage system wherein a damped oscillating magnetic field is desired to sensitize ferromagnetic markers used in conjunction with the anti-pilferage system. Such markers are sensitized by subjecting them to a damped oscillatory magnetic field which removes any remanent magnetization present in the ferromagnetic markers. In a preferred embodiment, a field of approximately 350 oersteds peak intensity is desired in order to effect such demagnetization. Further, the marker is desirably subjected to a number of magnetic reversals, each of which has a decreasing intensity, such that the magnetization within the marker is swept through a series of decreasing intensity hysteresis cycles, terminating in a zero intensity remanent magnetization.

In the circuit shown in FIG. 2 for producing such a demagnetization, a 110 volt source of power is applied at terminal 31, via a closed power switch 25 and fuse 26 to a power source section shown generally as 33. A voltage tripling network comprising diodes 29, 30 and 32 produces a D.C. voltage of approximately 450 volts on lead 39. This voltage is applied to the storage capacitor 10.

The SCR 20 shown in FIG. 1 is depicted by the parallel connected SCRs 20a and 20b. Triggering of SCRs 20a and 20b is provided by the triggering circuit shown generally as 55. Closing of a manually operated switch 100 changes the bias on control transistor 86 causing it to conduct and thereby cause the driving transistors 68 and 84 to similarly conduct. Driving transistors 68 and 84 are in turn coupled to the gates of the SCRs 20a and 20b, such that conduction of the driving transistors 68 and 84 produces trigger pulses which cause the SCRs 20a and 20b to switch to a conducting state. A voltage divider comprising resistors 56, 60 and 64 is connected in parallel across the storage capacitor 10. Potentials from the voltage divider are coupled from the voltage divider to the anode and gate of SCR 92, which is in series with the emitter of transistor 86, in order to further control the production of trigger pulses to the power SCRs 20a and 20b. If a predetermined voltage is present on storage capacitor 10, a portion of the voltage is coupled via the voltage divider to the anode of SCR 92 with another portion connected via a resistor 62 to gate electrode of SCR 92, causing it to conduct, enabling the trigger pulse from the control transistor 86 to activate the switching transistors 68 and 84. If, on the other hand, storage capacitor 10 has not charged to a potential such that upon discharge through the autotransformer 12, a magnetic field of at least a predetermined intensity would not be generated, the SCR 92 will not become switched to a conductive state. This prevents transistor 86 from conducting because of the bias applied to the transistor 86 keeping it from conducting regardless of the closure of switch 100. This in turn prevents the switching transistors 68 and 84 from conducting and thereby from producing positive trigger pulses to the gates of SCRs 20a and 20b.

A modification for producing a unidirectional magnetic field in place of the damped oscillatory magnetic field is provided by the sensitization circuit shown generally as 45. In this circuit, the two position switch 50 is normally in a position to energize indicator light 54 indicating that the circuit is connected to produce the damped oscillatory sensitizing magnetic field. In the event a unidirectional magnetic field is desired to de-sensitize (i.e. magnetize) a ferromagnetic marker, switch 50 is switched to connect the series diode 40 and resistor 44 in parallel with the primary portion 14 of the autotransformer 12. The effect of diode 40 and resistor 44 is to short out the reverse currents flowing through the primary portion 14 and result in the production of a unidirectional magnetic field.

In the embodiment shown, the storage capacitor 10 has a valve of 1050 microfarads and is used in conjunction with a resonant circuit wherein the primary portion 14 of the autotransformer 12 contains 19 turns, the secondary portion 16 of the autotransformer 12 contains 57 turns to utilize a one-third turns ratio. The resonating capacitor 18 has a capacitance of 80 microfarads. Such valves are not overly interdependent, and a variety of various values may interchangeably be used, depending upon the applications and characteristics of the desired oscillating current. In a second embodiment wherein a lower intensity damped oscillatory magnetic field was desired, capacitor 10 was selected to have a value of 550 microfarads. The choice of capacitance of the storage capacitor 10 is largely predicated by the requirements of the desired application, such that a larger capacitor at a given voltage rating with attendant greater size, weight and expense may be utilized if one requires more intense fields.

The characteristics of the resonant circuit 24 may likewise be varied over large ranges depending upon the desired frequency of the damped oscillations. In a further embodiment, the resonating capacitor 18 is selected to have a capacitance of 40 microfarads, resulting in approximately 1.4 times the resonant frequency as that of the embodiment shown in FIG. 2. In a still further embodiment the ratio of the turns in the primary portion 14 to total turns in the autotransformer 12 may range from 1 to 5, to 2 to 3, the upper and lower limits being dictated by the desired multiplication in voltage from the primary portion 14 to secondary portion 16, the extent to which sufficient energy can be coupled into the primary portion 14 in order to create the desired current in the resonating circuit 24 and limits on reliably commutating the SCR. In some applications, the production of a more uniform magnetic field is desired. This is conveniently produced by the present invention by winding the autotransformer in a non-linear manner to compensate for leakage flux.

In another embodiment, the autotransformer may be replaced with an equivalent two winding transformer, in which the primary and secondary portions are electrically separate, thereby allowing the resonant circuit to be isolated or grounded. In such a case, the circuit parameters may vary in the same manner as afore discussed. In either case, the commutation is accomplished as a result of the reversal of the voltage across the primary portion of the transformer momentarily exceeding the opposing voltage remaining in the D.C. storage capacitor. In all of the above embodiments, the waveform in the primary portion is the same as that in the resonant circuit.

The component values preferably used in the circuit shown in FIG. 2 are as follows:

| Capacitors | | Resistors | | Transistors & Diodes | |
| --- | --- | --- | --- | --- | --- |
| 10 | 1050 μf, 450V | 27 | 1Ω10 wt | 20a and 20b | 2N3899 |
| 18 | 80 μf | 36 | 100K | 29 | 1N5406 |
| 28 | 40 μf 370V | 40 | 50K | 30 | 1N5406 |
| 34 | 40 μf 150V | 44 | .Ω10 wt | 32 | 1N5406 |
| 58 | 50 pf | 46 | 100K | 42 | 1N914 |
| 72 | 0.03 μf | 52 | 100K | 68 | 2N5139 |
| 80 | 0.03 μf | 56 | 150K | 84 | 2N 5139 |
| 102 | 0.05 μf | 60 | 10K | 86 | 2N3392 |
| 106 | 1 μf, 25V | 62 | 2.2K | 90 | 1N5406 |
| | | 64 | 330Ω | 92 | 2N5787 |
| INDUCTOR | | 66 | 27Ω | 104 zener | VR18 |
| 12 Autotransformer: | | 70 | 100Ω | | |
| Total of 57 turns of No. 10AWG copper wire, having tap 19 turns from one end, the 19 turn portion defining the primary portion, and the entire winding the secondary portion. | | 74 | 2.2K | | |
| | | 76 | 10K | | |
| | | 78 | 2.2K | | |
| | | 82 | 27Ω | | |
| | | 88 | 2.2K | | |
| | | 94 | 100Ω | | |
| | | 96 | 100K | | |
| | | 98 | 470 K | | |

What is claimed is:

1. In an electrical circuit for producing a magnetic field which circuit comprises a D.C. power source providing a predetermined amount of electrical energy, a resonant circuit comprising an inductive component in parallel with a resonating capacitor, a silicon controlled rectifier (SCR) and means for controllably switching the SCR to a conductive state to complete the circuit, the improvement wherein said inductive component is an autotransformer having a winding containing a total of at least 30 turns, having a primary portion containing between one-fifth and two-thirds of the total number of turns and having fewer turns than in a secondary portion, and wherein said primary portion is connected in series with said power source and said SCR, said SCR when switched to a conductive state permitting current to flow from the D.C. power source through said primary portion, thereby coupling electrical energy from said primary portion to said secondary portion, to transfer said electrical energy to said resonant circuit, a counter-EMF being developed due to reverse discharging of said resonating capacitor following transfer of said electrical energy to commutate the SCR, the electrical energy coupled from the primary portion to the secondary portion then being dissipated in oscillations in the resonant circuit.

2. An electrical circuit according to claim 1 wherein the total number of turns of said autotransformer is approximately 60, said primary portion of said autotransformer having approximately 20 turns, said secondary portion comprising the total number of turns, and said resonant circuit having a resonant frequency between 300 and 2,000 Hz.

3. An electrical circuit according to claim 1 wherein said D.C. power source comprises an electrolytic capacitor having a nominal capacitance of at least 300 uf and suitable for repeatedly storing charge at a potential of at least 450 VDC, and wherein switching of said SCR to a conducting state causes a predetermined amount of charge to be discharged from said electrolytic capacitor through said primary portion of the autotransformer means to induce a current in said secondary portion to generate a magnetic field having a peak intensity of at least 350 oersteds.

4. An electrical circuit according to claim 1, further comprising a diode connected in parallel with said primary portion of said autotransformer, wherein reverse oscillating currents in said resonant circuit are shorted out, thereby causing a unidirectional magnetic field to be produced by said resonant circuit.

5. An electrical circuit according to claim 1 wherein said switching means comprises manual control means for initiating a signal pulse and switching means responsive to said signal pulse and coupled to said SCR for providing a trigger pulse to the gate of the SCR when a signal pulse is received.

6. An electrical circuit according to claim 5 wherein said switching means further comprises means for sensing the potential across said D.C. power source and for preventing said SCR from being switched to a conductive state unless said potential across said D.C. power source is in excess of a predetermined value.

7. In an anti-pilferage system utilizing ferromagnetic markers capable of producing a characteristic signal when subjected to a magnetic field of at least a predetermined peak intensity within an interrogation zone, an electrical circuit for producing a said magnetic field, which circuit comprises a D.C. power source providing a predetermined amount of electrical energy, a resonant circuit comprising an inductive component in parallel with a resonant capacitor, a silicon controlled rectifier (SCR) and means for controllably switching the SCR to a conductive state to complete the circuit, the improvement wherein said inductive component is an autotransformer having a winding containing a total of at least 30 turns, having a primary portion containing between one-fifth and two-thirds of the total number of turns and having fewer turns than in a secondary portion, and wherein said primary portion is connected in series with said power source and said SCR, said SCR when switched to a conductive state permitting current to flow from the D.C. power source through said primary portion, thereby coupling electrical energy from said primary portion to said secondary portion, to transfer said electrical energy to said resonant circuit, a counter-EMF being developed due to reverse discharging of said resonating capacitor following transfer of said electrical energy to commutate the SCR, the electrical energy coupled from the primary portion to the secondary portion then being dissipated in oscillations in the resonant circuit.

8. In an anti-pilferage system utilizing ferromagnetic markers capable of producing a characteristic signal when subjected to a magnetic field of at least a predetermined peak intensity within an interrogation zone, said markers being further capable of becoming desensitized to prevent the production of said characteristic signal when subjected to said magnetic field, a resensitizing device for restoring said markers to a state wherein said characteristic signals are produced when said markers are subjected to said magnetic field, an electrical circuit for producing a said magnetic field, which circuit comprises a D.C. power source providing a predetermined amount of electrical energy, a resonant circuit comprising an inductive component in parallel with a resonating capacitor, a silicon controlled rectifier (SCR) and means controllably switching the SCR to a conductive state to complete the circuit, the improvement wherein said inductive component is an autotransformer having a winding containing a total of at least 30 turns, having a primary portion containing between one-fifth and two-thirds of the total number of turns and having fewer turns than in a secondary portion, and wherein said primary portion is connected in series with said power source and said SCR, said SCR when switched to a conductive state permitting current to flow from the D.C. power source through said primary portion, thereby coupling electrical energy from said primary portion to said secondary portion, to transfer said electrical energy to said resonant circuit, a counter-EMF being developed due to reverse discharging of said resonating capacitor following transfer of said electrical energy to commutate the SCR, the electrical energy coupled from the primary portion to the secondary portion then being dissipated in oscillations in the resonant circuit.

9. In an anti-pilferage system according to claim 8 wherein the improvement to said electrical circuit includes means for desensitizing said markers, said desensitizing means comprising a diode connected in parallel with said primary portion of said autotransformer, wherein reverse oscillating currents in said resonant circuit are shorted out, thereby causing a unidirectional magnetic field to be produced by said resonant circuit.

* * * * *